United States Patent [19]
Hill

[11] 3,885,286
[45] May 27, 1975

[54] STREAMER MANUFACTURE
[75] Inventor: A. C. Hill, Houston, Tex.
[73] Assignee: Teledyne Exploration Company, Houston, Tex.
[22] Filed: Nov. 23, 1973
[21] Appl. No.: 418,659

[52] U.S. Cl. ............ 29/203 D; 29/169.5; 29/200 B; 29/241; 29/433; 15/104.06 R
[51] Int. Cl. ..................................... H01r
[58] Field of Search ...... 29/169.5, 203 MW, 203 D, 29/200 R, 200 B, 433, 241, 244, 421 R; 15/104.16, 104.06 R, 104.05; 156/294; 254/134.4, 134.3 FT

[56] References Cited
UNITED STATES PATENTS

| | | | |
|---|---|---|---|
| 646,545 | 4/1900 | Novotny | 15/104.06 R |
| 2,869,226 | 1/1959 | Schurman | 29/433 X |
| 3,179,375 | 4/1965 | Hamrick | 15/104.06 R X |
| 3,763,896 | 10/1973 | Horne et al. | 15/104.06 R X |
| 3,778,878 | 12/1973 | Bindari | 29/421 R X |

*Primary Examiner*—C. W. Lanham
*Assistant Examiner*—Victor A. Di Palma
*Attorney, Agent, or Firm*—Murray Robinson

[57] ABSTRACT

A seismic streamer comprises a cable harness inside an oil filled sheath. The sheath is a flexible plastic tube. The harness includes a plurality of hydrophones and associated electrical conductors, strain rope, spacers, and bulkheads. Prior to assembly with the sheath, the harness is wound on a reel inside a pressure vessel containing oil and air. One end of the harness is fed through a spigot at the side of the vessel below the oil level and connected to a free piston which is inserted into one end of the sheath. The sheath is attached to the spigot at the side of the vessel below the oil-air interface. The air in the tank is presurized placing the oil under pressure, and the harness and oil are fed to the sheath through the spigot. The pressurized oil forces the piston to move along the several hundred feet of sheath, pulling the harness into the sheath at a rate regulated by unwinding of the reel. The reel is actuated by a hydraulic motor. The piston is provided with a lubricator at its leading end, a pint or so of oil being placed in the sheath before it is attached to the spigot. The sheath is initially expanded by admitting air under pressure through a check valve at the other end of the sheath from the end attached to the spigot. A pressure relief valve maintains the desired air pressure in the sheath.

11 Claims, 11 Drawing Figures

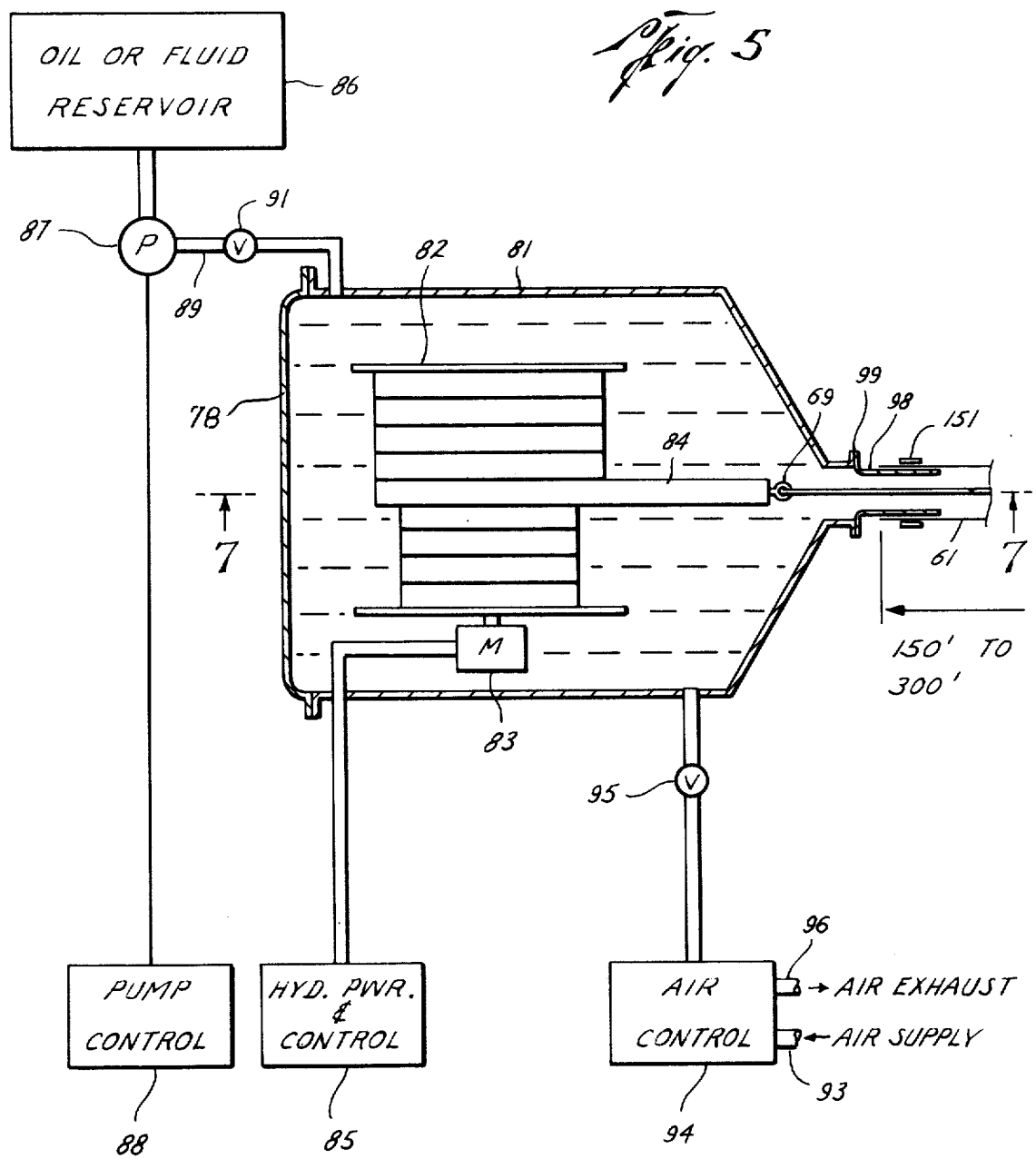

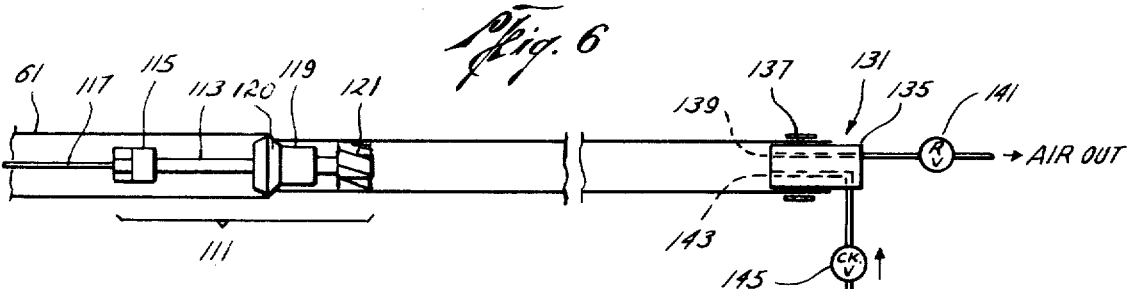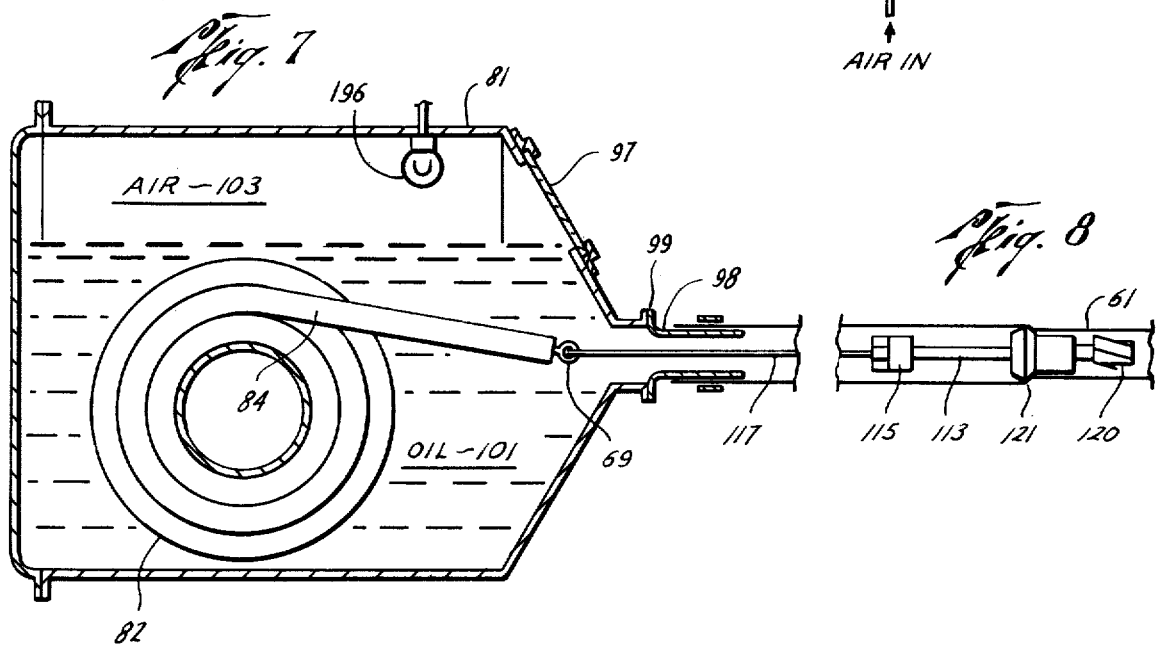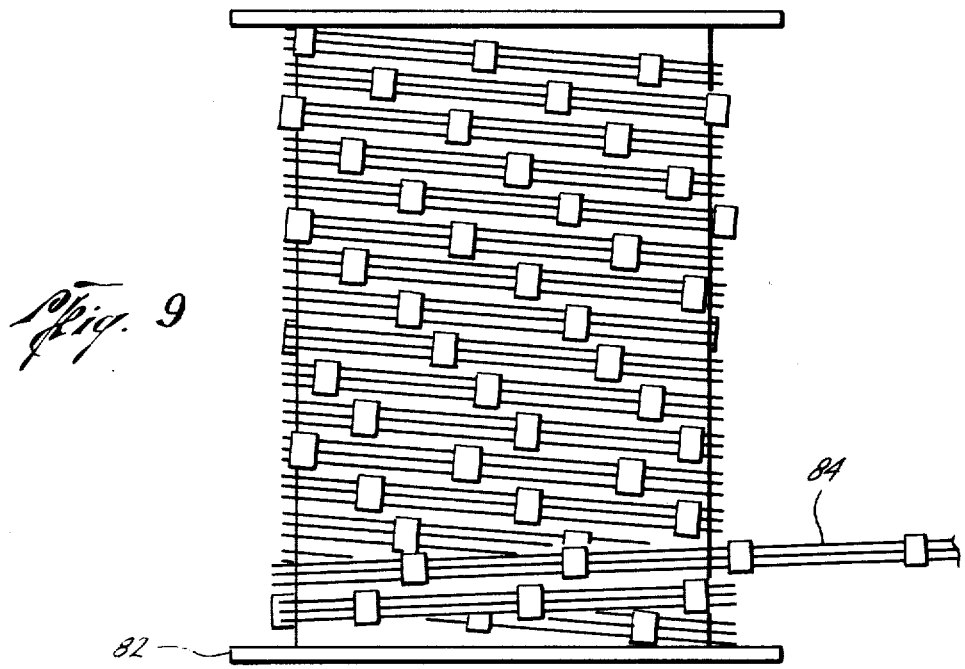

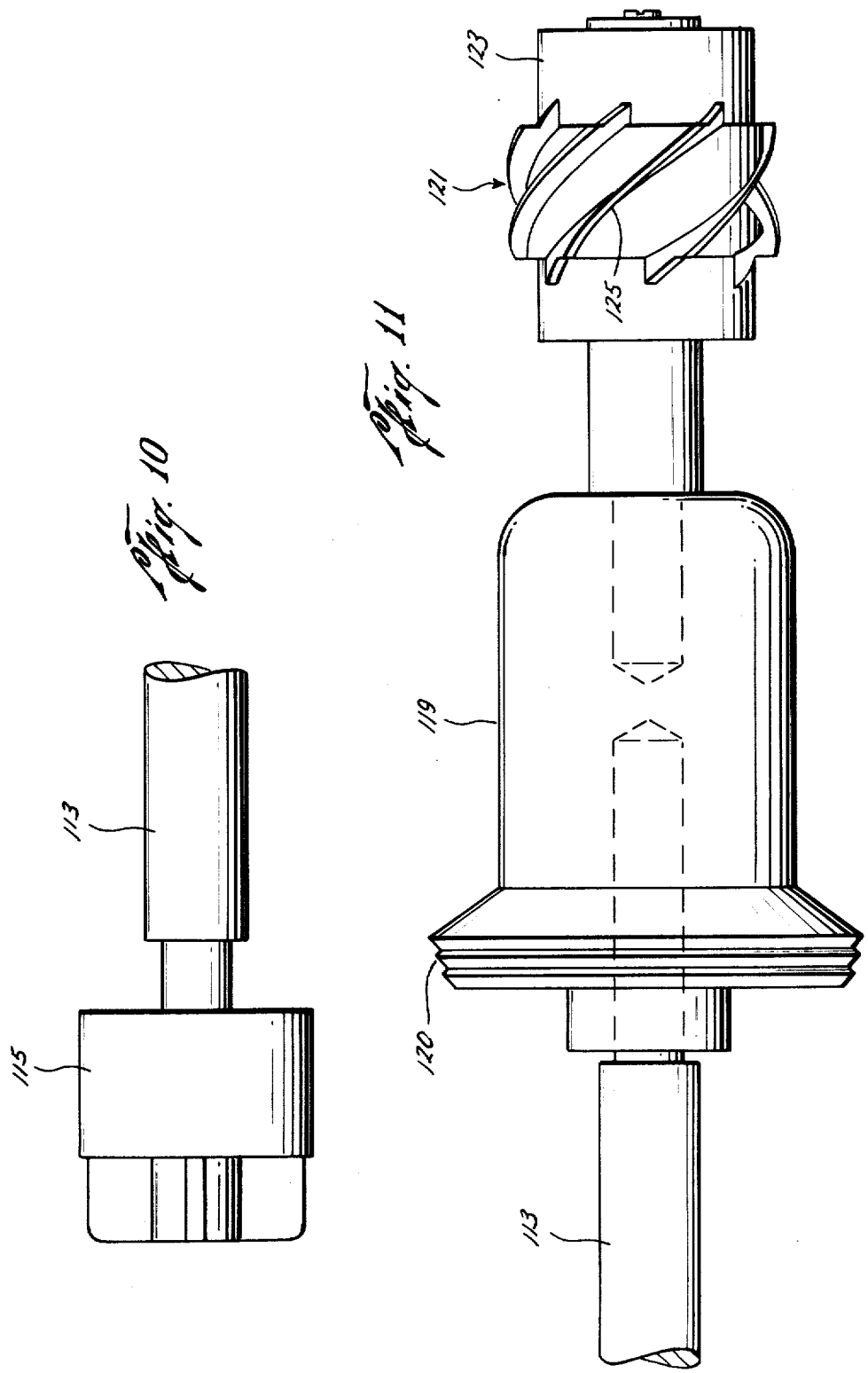

STREAMER MANUFACTURE

BACKGROUND OF THE INVENTION

1. Field of the Invention

This invention relates to a method of and apparatus for inserting linearly distributed components into an elongated housing and more particularly to the insertion of mechanico-electrical transducers, electrical conductors, oil, and associated mechanical elements into a plastic tube to form a streamer.

2. Brief Description of the Prior Art

In the course of conducting seismic surveys for the purpose of producing reflection profiles of the earth's crust, it is a requirement that arrays of mechanico-electrical transducers or sensors, e.g., pressure sensitive hydrophones, be towned behind the survey ship for the purpose of sensing reflected acoustic signals. These arrays are commonly referred to as streamers, and they consist of many discrete sensors electrically connected together and installed inside a sheath comprising a flexible tube (usually plastic) that is filled with oil. The overall length of the tubes varies according to the job requirement but most are made in sections that are 150 to 300 feet in length. In addition to sensors and oil, each section contains many electrical conductors, strain member or members (usually wire rope) and spacers that protect the internal components and cause the section to maintain a cylindrical shape. Each end of a section is sealed with a liquid tight bulkhead that permits electrical feed through of each conductor and mechanical continuity of the strain members. The arrays are towed beneath the water and may be used singularly or in compound arrangements with sections attached end to end.

Streamer stuffing, i.e., the placement of the electrical and mechanical components (the harness) within the plastic tube and filling the tube with oil or other fluids presents a considerable problem. Perhaps the original method of installing a harness within a sheath was simply to pull the sheath over the harness by hand, pulling on the sheath and harness with ropes.

Another and better method of streamer stuffing in use prior to the present invention involves the use of a long rigid pipe and a vacuum process. This method is generally as follows:

a. A pipe of the required length is furnished with an inside diameter slightly larger than the outside of the streamer to be constructed.

b. The streamer sheath is pulled inside the pipe with a winch and each end is sealed against the mouth of the pipe. A vacuum is imposed on the space between the sheath and the inside of the pipe. This expands the flexible sheath to a diameter larger than that of the harness and spacers that are to be installed inside. This also allows for open passage through both ends of the sheath.

c. A steel cable is then placed completely through the sheath. One end of this cable is attached to the drum of a powered winch.

d. The harness which is made up of the sensors, conductors, spacers, strain members, etc., is then attached to the wire rope and is pulled into the sheath with the winch.

e. After the harness has been drawn into the sheath, the vacuum is released and the sheath returns to its normal diameter and closes around the cylindrical spacers of the harness.

f. The streamer section is then pulled by a winch or other means from the vacuum pipe.

g. Metal bands are clamped around each end of the section to form a seal between the sheath and the liquid tight bulkheads.

h. The section is then arranged in a relatively straight line on a flat surface for oil filling.

i. The oil is pumped from a storage container into one end of the streamer through a fitting provided for this purpose. A fitting in the other end allows the displaced air to escape. As the oil flows into the sheath, the cable must be elevated at the point of oil air interface to minimize trapping of air along the cable. This point of elevation must be maintained along the length of the cable as the filling progresses.

j. After the cable has been filled, the end with the air vent is elevated and the trapped air bubbles are "walked" out by elevating the cable at one point and slowly moving this point of elevation toward the air vent. This may require several identical operations before all air is removed.

k. Each end is then secured and the section is completed.

Although the above described vacuum method is a considerable improvement over the earlier brute force pull over method, the vacuum method still required a considerable amount of time and the forces imposed on the harness and sheath during the method were sufficient to be likely to damage them both. In addition, the requirement for a long straight vacuum pipe of a length equal to that of the streamer made it impossible to use the method for replacement of a streamer sheath on board a boat or ship of the size used in seismic work.

In an effort to overcome the aforementioned difficulties, Teledyne Exploration Company devised a new method hereinafter referred to as the pressure method, according to which the sheath is expanded by internal air pressure and the harness is pulled through the sheath by a free piston, oil under pressure being admitted to the end of the sheath through which the harness enters and providing the pressure for forcing the piston along the interior of the sheathing. The harness is fed to the sheathing from a reel; the reel is mounted in a pressure vessel in which also is contained both the oil and air to pressurize the oil. The sheathing is attached to a spigot at the side of the pressure vessel through which emerges the harness and oil.

The above described pressure method provides a number of improvements over the aforementioned vacuum method. These are as follows:

a. The new method is much faster and cuts manufacturing time for this process to about one-fourth of what it was previously.

b. Elimination of the need for a long straight vacuum pipe allows replacement of streamer sheaths aboard ship. This was not possible before.

c. The harness and the oil are injected into the sheath simultaneously and the need to walk out air bubbles is eliminated.

d. This process minimizes the possibility of damage to the components of the harness during the sheathing process. The strong forces required in previous winching methods sometimes impose damaging stresses and strains.

e. The plastic sheaths used in manufacturing streamer sections are usually transparent. Observation of the progress of insertion of the harness is now possible.

Experiments using this general principle were conducted as early as 1969. Development was continued sporadically from that time until certain features were added in December, 1972, which made this method practical. It is now in use as a standard process by Teledyne Exploration Company, Houston, Tex.

Prior to December 1972, some of the features of the system were used in the fabrication of streamer cables on an experimental basis. The continued development of the system was made possible by the receipt of orders from customers that related to the resheathing of streamers. It was not practical or economically feasible to develop the system or technique without specimens to work with and funds to support the development. Several prototypes were built for experimentation during this period but were discarded as impractical. To the extent the use of the pre-December 1972 apparatus does not bar it from patent protection and to any extent the inventorship may be the same as that named herein, Teledyne Exploration Company, assignee, desires to patent same herein.

SUMMARY OF THE INVENTION

The original apparatus built by Teledyne was designed to fill a 1 inch diameter streamer. A later version was built several years ago. The present invention is an improvement upon the earlier Teledyne method and apparatus and incorporates the following additional features:

1. a hydraulically operated reel to feed off the harness to the advancing free piston at a controlled speed.
2. a lubricator in advance of the free piston to prevent binding of the piston. 3. air inlet and pressure relief valve means at the downstream end of the streamer sheath through which the streamer is pressurized in advance of the free piston.

BRIEF DESCRIPTION OF THE DRAWINGS

For a detailed description of a preferred embodiment of the invention reference will now be made to the accompanying drawings wherein

FIGS. 5 and 6 together form a partly schematic horizontal section through apparatus in accordance with the invention, showing the streamer sheath attached to the pressure vessel and the free piston putting the harness from the reel into the sheath;

FIGS. 7 and 8 together form a partly schematic vertical section of the apparatus of FIGS. 5 and 6 showing same prior to attachment of the sheath to the pressure vessel spigot;

FIG. 9 is a partly schematic side view of a streamer harness wound on a reel in accordance with the invention;

FIGS. 10 and 11 together form a side view of a go-devil comprising (FIG. 11) the lubricator provided according to the invention and the associated free piston and (FIG. 10) the rear guide to which the streamer harness is to be connected.

DESCRIPTION OF PREFERRED EMBODIMENT

Figure 1:
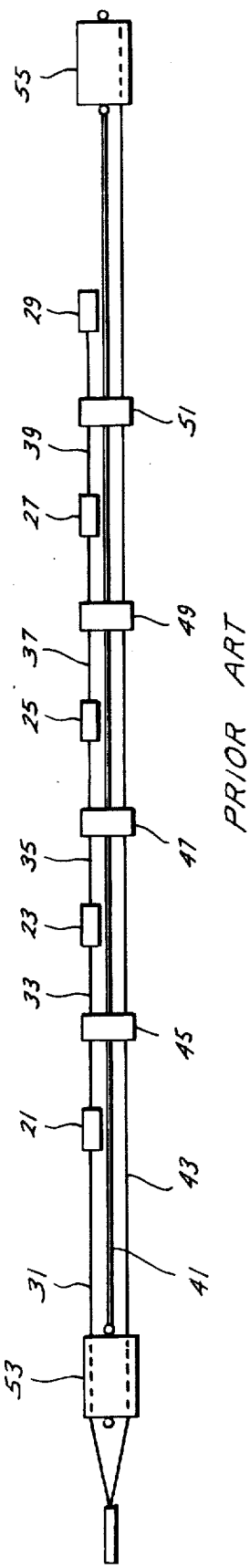
FIG. 1 is a partly schematic side view of a streamer harness of a type that can be made in accordance with the apparatus and method of the invention.

Referring now to FIG. 1 there is shown a harness section comprising a plurality of hydrophones 21, 23, 25, 27, 29, with associated electrical conductors 31, 33, 35, 37, 39, strain rope 41, through electrical conductors 43, spacers, 45, 47, 49, 51, and bulkheads 53, 55.

Figure 2:
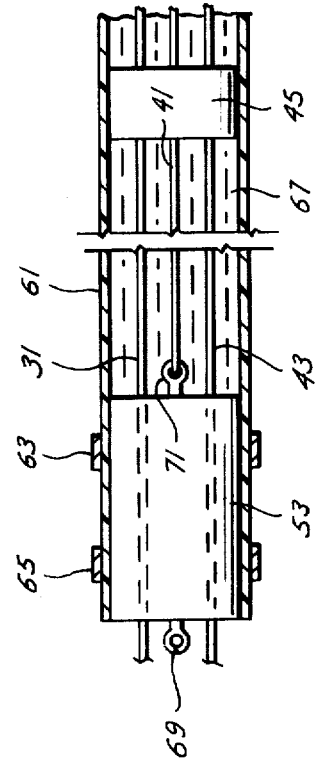

FIG. 2 shows the bulkhead 53 is sealed to the transparent flexible plastic tube that forms sheath 61 by means of annular straps 63, 65 extending around the sheath and holding it tightly to the bulkhead. The interior of the sheath around the harness is filled with oil 67.

Eyes 69, 71 extend from the bulkhead at opposite ends thereof to provide means for making connection to strain rope 4. The strain rope together with through conductors 43 and local conductors such as 31 extend through the spacers, such as 43, that separate the hydrophones.

Figure 4:
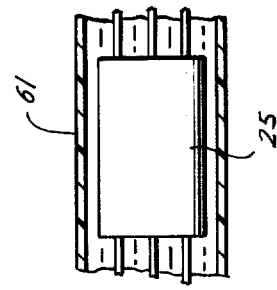
FIGS. 2, 3 and 4 are fragmentary sections showing component portions of a streamer comprising a sheathing and a harness of the type shown in FIG. 1.
Figure 3:
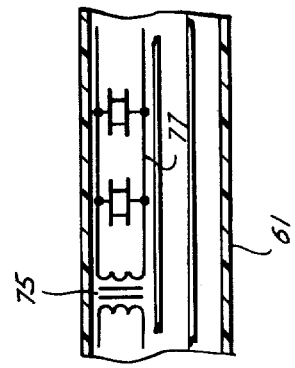

As shown in FIGS. 3 and 4, each hydrophone streamer includes a coupling transformer, such as 75, and responsive elements 77.

Referring now to FIGS. 5 and 6, there is shown a steel pressure vessel 81 within which is a reel 82, shown in detail in FIG. 9. One end 78 of the vessel is removable for easy access to the interior. The reel is mounted for constant about a horizontal axis and is driven at controlled speed by hydraulic motor 83. Wound on the reel is a streamer harness 84 of the type shown in FIG. 1. The hydraulic motor 83 is supplied with hydraulic fluid under pressure at controlled rate of flow by controller 85 which may be any suitable type.

Oil for the pressure vessel 81 is supplied from reservoir 86 by reversible electric pump 87. Electrical controller 88 governs the speed of pump 87. The pump is connected to the pressure vessel through pipe 89 in which line there is a hand operated shut off valve 91.

The pressure vessel is supplied with air under pressure from a suitable source, not shown, such as an air compressor, through line 93, adjustable pressure regulator 94, and valve 95. Regulator 94 exhausts through line 96.

The pressure vessel is interiorly lighted as shown at 19, and is provided with a transparent inspection port 97. The pressure vessel is funnel shaped and at the small diameter part of the funnel is a spigot 98 which has a diameter slightly larger than the diameter of harness 84 so that the harness can pass therethrough, e.g., into sheath 61. Preferably, the spigot 98 is connected to the pressure vessel by bolted flanges as shown at 99 so that different size spigots can be substituted easily.

As best shown in FIG. 7, the level of the oil 101 is above the spigot 98 during operation of the equipment to stuff a streamer. To prevent oil from leaking out the spigot when the sheath is unconnected thereto, as shown in FIG. 8, the oil level may be lowered below the spigot by reversing pump 87. After the sheath 61 has been connected to the spigot, the pump 87 is run in a direction to bring the oil level up above the level of the spigot, preferably above the level of the harness wound on the reel, so as to prevent the air 103 from escaping with the harness through the spigot.

Referring now to FIGS. 6 and 8, 10, and 11 there is shown within sheath 61 a go-devil 111. The go-devil has a maximum relaxed outer diameter slightly larger than the inner diameter of sheath 61. The go-devil comprises a fairly rigid plastic tube 113 having at its rear end a guide hub 115 adapted to be connected by a cable 117 to eye 69 on the harness. At the forward end of the tube 113 is a piston 119 having flexible lip type annular seals 120 at its trailing end. The seals are adapted to contact and seal with the inner periphery of sheath 61. In advance of piston 119 is an oil spreader or lubricator 121 comprising a rotatably mounted hub 123 having one and preferably several overlapping helical ribs 125 extending thereabout adapted to contact the entire inner periphery of the sheath 61. As the lubricator 121 rotates about the axis of tube 113, the entire inner surface of the sheath will be contacted with oil.

Referring now to FIG. 6, at the end of sheath 61 is connected a valve 131 comprising a body 135 adapted to fit within and be clamped in sealing engagement with sheath 61 by straps 137. A passage 139 extending axially through body 135 leads to constant presure relief valve 141, and a side port 143 leads to an air admission check valve 145.

The apparatus which has been described can be operated in almost any environment, e.g., on the deck of a boat, the only requirements being: available electric power, pressure air supply, and a supply of fluid for filling the pressure vessel. The standard procedure for completing a streamer section using this apparatus is as follows:

a. The streamer harness 84 is placed through the spigot 98 and stored on reel 82. During this process the reel is powered by motor 83 and controlled by hydraulic valves 85. A short portion of the harness is left extending out of the spigot 98.

b. The go-devil 111 is attached to the end of the harness and inserted into the end of the sheath 61. A small amount, e.g. a pint, of lubricating oil is poured into the sheath before inserting the go-devil.

c. The sheath is slipped over the spigot 98 and secured to the spigot by means of metal bands or hose clamps 151.

d. The valve 131 is installed in the other end of the sheath and secured with hose clamps 137.

e. Using control 88 and pump 87, oil or other fluid is transferred from reservoir 86 into pressure vessel 81. The vessel is filled to a desired level above the point at which the sheath is attached. At this point in the operation, the pump 87 is shut off, and the oil line closed using valve 87.

f. Using adjustable regulator 94 the pressure within the chamber is increased by introducing pressurized air from a compressor or other source. This pressure is monitored at regulator 94 and shut off after reaching a predetermined level for example 25 psi. The vessel is then sealed by closing valve 95.

g. Air pressure is applied through check valve 145 of the valve unit 137 until pressure within the sheath 61 reaches a predetermined level for example 10 psi, as set by relief valve 141. This inflates the plastic sheath making it round and slightly larger than its normal diameter. This allows the go-devil to pass through and, because of the roundness, to seal more efficiently. The preset pop-off valve 141 maintains the desired pressure ahead of the go-devil.

h. Next the reel is put into operation using external controller 85, and the harness is pulled into the sheath by the attached piston due to forces imposed upon it by the air pressure acting through fluid. As the piston moves through the sheath, the sheath is filled with fluid simultaneously. During the traverse of the harness, the lubricator 121 at the leading end of the piston 119 is in contact with the inside of the sheath. It rotates due to its shape and distributes the lubricating oil on the inside of the sheath. This allows the piston to move freely and also aids in sealing at this point of contact.

i. After the harness has been placed within the sheath the reel is stopped and metal bands or hose clamps are secured around the sheath at each end. This seals the sheath to the liquid tight bulkheads.

j. The excess sheath is trimmed from each end of the streamer section and the operation is complete.

Several streamer sections can be connected together end to end in connventional fashion to form a streamer of greater length if desired.

While a preferred embodiment of the method and apparatus of the invention has been described and illustrated, modifications thereof can be made by one skilled in the art without departing from the spirit of the invention.

I claim:

1. Apparatus for assembling a seismic streamer comprising
   a pressure vessel containing a rotatably mounted reel adapted to have a seismic streamer harness wound thereon,
   said vessel being adapted to contain oil, adapted for filling a seismic streamer sheath, and pressurized air over the oil,
   said vessel having an outlet adapted to be connected to said sheath for a seismic streamer and through which a harness wound on the reel can extend, and
   means for driving the reel at controlled speed to pay out the harness to such sheath.

2. Apparatus according to claim 1 having a seismic streamer harness wound on the reel and having attached to the free end of the harness a go-devil comprising a piston adapted to seal with the inner periphery of said sheath and a lubricator in advance of the piston.

3. Apparatus according to claim 2 in which the lubricator includes a hub having a plurality of circumferentially overlapping helical ribs thereabout.

4. Apparatus according to claim 3 wherein the hub is rotatably mounted about the go-devil axis.

5. Apparatus according to claim 2 including a tubular seismic streamer sheath connected at one end to the pressure vessel outlet and closed at the other by a constant pressure relief valve, the go-devil being disposed in said sheath, and a quantity of lubricating oil being disposed in said sheath between the piston and said relief valve.

6. Apparatus according to claim 1 including a tubular seismic streamer sheath connected at one end to the pressure vessel outlet, and valve means connected to the other end of the sheath including a relief valve to hold a preset air pressure within the sheath.

7. Apparatus according to claim 5 wherein the valve means further includes an inlet check valve through which air can be admitted to pressurize the sheath.

8. Apparatus according to claim 7, the go-devil including a piston, a lubricator ahead of the piston and a guide to the rear of the piston.

9. Method of operating the apparatus of claim 7 comprising maintaining a pressure differential in the apparatus between the air in the pressure vessel and the air in the sheath tending to move the oil in the vessel and the go-devil in the sheath toward the valve means at the end of the sheath and drawing the reel at desired speed to pay out the harness.

10. Method of operating the apparatus of claim 7 comprising maintaining a constant above atmosphere air pressure in the sheath in advance of the go-devil to expand the sheath.

11. Method of operating the apparatus of claim 8 including introduction of lubricating oil into the sheath in advance of the lubricator.

* * * * *